(12) United States Patent
Ruston

(10) Patent No.: US 7,235,273 B2
(45) Date of Patent: Jun. 26, 2007

(54) TIE DOWN REINFORCED INFUSION BAG

(76) Inventor: Andrea Ruston, 212 W. Nicholai St., Hicksville, NY (US) 11801

( * ) Notice: Subject to any disclaimer, the term of this patent is extended or adjusted under 35 U.S.C. 154(b) by 238 days.

(21) Appl. No.: 10/743,183

(22) Filed: Dec. 22, 2003

(65) Prior Publication Data

US 2005/0135711 A1    Jun. 23, 2005

(51) Int. Cl.
| B65D 33/16 | (2006.01) |
| B65D 33/02 | (2006.01) |
| B65B 29/04 | (2006.01) |
| A47G 19/16 | (2006.01) |

(52) U.S. Cl. .............. 426/83; 206/0.5; 383/76; 383/89; 383/119

(58) Field of Classification Search ........... 426/77, 426/79, 81–83; 383/35, 76, 89, 26, 86, 119; 206/0.5
See application file for complete search history.

(56) References Cited

U.S. PATENT DOCUMENTS

| 723,287 | A |   | 3/1903  | Lawson et al. |            |
|---------|---|---|---------|---------------|------------|
| 952,375 | A | * | 3/1910  | Stanley       | 150/152    |
| 1,157,388 | A | * | 10/1915 | Hernhuter   | 383/26     |
| 1,182,580 | A | * | 5/1916  | Maxfield    | 150/100    |
| 1,310,796 | A |   | 7/1919  | Hirschhorn  |            |
| 1,677,397 | A |   | 7/1928  | Mock        |            |
| 1,690,046 | A | * | 10/1928 | Ament       | 383/26     |
| 1,947,523 | A |   | 2/1934  | Hirschhorn  |            |
| 2,491,929 | A | * | 12/1949 | Orchard     | 383/17     |
| 3,057,728 | A |   | 10/1962 | Parrilla    |            |
| 3,092,242 | A |   | 6/1963  | Irmscher    |            |
| 3,175,911 | A |   | 3/1965  | Rambold     |            |
| 3,539,355 | A |   | 11/1970 | Kasakoff    |            |
| 4,680,185 | A |   | 7/1987  | Illk        |            |
| 5,322,700 | A | * | 6/1994  | Drake et al.  | 426/79   |
| 5,366,741 | A | * | 11/1994 | Van Der Zon | 426/79     |
| 5,797,243 | A | * | 8/1998  | Tagliaferri et al. | 53/413 |
| 6,746,699 | B2| * | 6/2004  | Lohrey et al. | 426/83   |
| 2001/0007688 | A1 | * | 7/2001 | Klar      | 426/80     |
| 2004/0071830 | A1 | * | 4/2004 | Klar      | 426/77     |

FOREIGN PATENT DOCUMENTS

| DE | 3826911 A1 | * | 2/1990 |
| DE | 29613448 U1 | * | 9/1996 |
| EP | 260229 A2 | * | 3/1988 |
| GB | 2.167.380 |   | 5/1986 |
| JP | 2002211642 A | * | 7/2002 |
| WO | WO 91/13580 |   | 9/1991 |

* cited by examiner

Primary Examiner—Steve Weinstein
(74) Attorney, Agent, or Firm—Collard & Roe, P.C.

(57) ABSTRACT

The present invention 10 discloses an infusion bag 18 having means for selectively inserting any desired dry beverage material 16. The disposable infusion bag 18 has spaced apart reinforced elements 20 fixedly attached to the bag material with a string 22 passing through the elements in predetermined positions whereby pressure applied to the distal ends of the string causes the top corners 30 to fold forward engaging the bag whereupon the remaining triangular center element folds over covering the previously folded corners preventing any of the inserted material from escaping. The bag 18 may be reusable by unfolding the bag, discarding the used contents, replacing with fresh material and refolding the bag.

3 Claims, 8 Drawing Sheets

TIE DOWN REINFORCED INFUSION BAG

RELATED DOCUMENTS

This application is subject to the United States Document Disclosure program and is covered by Disclosure Document Ser. No. 532,823 filed 10 Jun. 2003.

BACKGROUND OF THE INVENTION

1. Field of the Invention

The present invention relates generally to infusion bags and, more specifically, to an infusion bag having means for selectively inserting any desired dry beverage material. The disposable infusion bag has spaced apart reinforced elements fixedly attached to the bag material with a string passing through the elements in predetermined positions whereby pressure applied to the distal ends of the string causes the top corners to fold forward engaging the bag whereupon the remaining triangular center element folds over covering the previously folded corners preventing any of the inserted material from escaping.

Furthermore, at the user's discretion the bag may be reusable by unfolding the bag, discarding the used contents, replacing with fresh material and refolding the bag.

2. Description of the Prior Art

There are other infusion bags designed for single beverage servings. Typical of these is U.S. Pat. No. 723,287 issued to Lawson et al. on Mar. 24, 1903.

Another patent was issued to Hirschhorn on Jul. 22, 1919 as U.S. Pat. No. 1,310,796. Yet another U.S. Pat. No. 1,677,397 was issued to Mock on Jul. 17, 1928 and still yet another was issued on Feb. 20, 1934 to Hirschhorn as U.S. Pat. No. 1,947,523.

Another patent was issued to Parrilla on Oct. 9, 1962 as U.S. Pat. No. 3,057,728. Yet another U.S. Pat. No. 3,092,242 was issued to Irmscher on Jun. 4, 1963. Another was issued to Rambold on Mar. 30, 1965 as U.S. Pat. No. 3,175,911 and still yet another was issued on Nov. 10, 1970 to Kasakoff as U.S. Pat. No. 3,539,355.

Another patent was issued to Illk on Jul. 14, 1987 as U.S. Pat. No. 4,680,185. Another was issued to Christie on May 29, 1986 as U.K. Patent No. GB2167380A and still yet another was issued on Sep. 19, 1991 to Shomarla PTY Limited as WIPO Patent No. WO91/13580.

U.S. Pat. No. 723,287

Inventor: Roberta C. Lawson et al.

Issued: Mar. 24, 1903

A holder for tea leaves or analogous use, consisting of a small pocket provided with a terminal flap and constructed of open-mesh fabric and having a longitudinally-extending stiffening means, a transversely-disposed and laterally-projecting bendable fastening means secured to the terminal and closing flap thereon.

U.S. Pat. No. 1,310,796

Inventor: Benjamin Hirschhorn

Issued: Jul. 22, 1919

A device for extracting essence from tea-leaves or coffee, comprising a bag of textile fabric having its mouth drawn into folds, a metal strip engaging and compressing said folds for closing the mouth of said bag, and a suspending string attached by said strip to said bag.

U.S. Pat. No. 1,677,397

Inventor: Hugo Mock

Issued: Jul. 17, 1928

The process of making tea bags by cutting a blank from a single sheet of paper, folding and twisting one end thereof to enclose a quantity of tea and forming a handle and label-portion for said tea bag integral with the bag holding portion.

U.S. Pat. No. 1,947,523

Inventor: Benjamin Hirschhorn

Issued: Feb. 20, 1934

A receptacle adapted to receive a substance from which the essence is to be extracted and used in a percolator having a water pipe, said receptacle being formed with an opening in the periphery thereof, a portion adapted to receive a percolator water pipe, and a manually operable closure for the opening, whereby the receptacle may be opened and closed at will.

U.S. Pat. No. 3,057,728

Inventor: John A. Parrilla

Issued: Oct. 9, 1962

A new article of manufacture, a bag for submerging in liquid to prepare a beverage by infusion comprising a pair of side walls, said side walls being formed of a porous material, a seam circumscribing the peripheral edge portions of said side walls to form a seal therearound to define a closed envelope, a supply of a soluble ingredient sufficient to brew an individual portion of a beverage disposed within said envelope and a flat rigid member medially disposed between said side walls within said sealed envelope, said member having a broad face and narrow edge and extends diametrically of said envelope so that its end portions are disposed contiguous to said seam at opposite ends of said envelope, said envelope and rigid member therein being proportioned so that the envelope and rigid member therein may be grasped at one end as the other end of said envelope and rigid member is disposed in a container of liquid for brewing whereby said member enhances manipulation of the envelope both within and without the container, and whereby said rigid member may be used to compress the soluble ingredients within said envelope to obtain rapid solubility, maximum strength of brew and a minimum of dripping.

U.S. Pat. No. 3,092,242

Inventor: Hans O. Irmscher

Issued: Jun. 4, 1963

A compressible infusion package comprising an infusion bag, a suspending string attached to an end of the infusion bag, a flexible cover member folded over said end of the infusion bag and defining two wings engaging the faces of the infusion bag, the fold of said cover being provided with an orifice for the loose reception of a portion of said string and being also provided with a slit for the tight reception of another portion of said string, the said string being loosely threaded through said orifice, being wound about and encircling the assembly of said member and infusion bag, and having its free end detachably received and anchored in said slit, the said cover member thereby serving the triple function of a packaging wrapper for the infusion bag held closed by said encircling and anchored string, a handhold for the bag in its infusion use and a means for compressing and squeezing the infused contents of said infusion bag.

U.S. Pat. No. 3,175,911

Inventor: Adolf Rambold

Issued: Mar. 30, 1965

An infusion device with a drop catcher, for preparing a beverage selected from the group consisting of tea and coffee in a pot having a projecting spout- and for pouring out the prepared liquid from said spout, which comprises a bag of fibrous filtered material containing an infusible substance for preparing said beverage, said device having a top and bottom layer and an integral part attached to one of said layers along a line of separation, thereby permitting said part to be easily severed from the remainder of said layer, and said part constituting a handling tag after its separation, a string secured at its opposite ends to said tag and to said bag, respectively, said tag having a line of perforations within its circumference conforming substantially to the shape of a spout of the pot for easy lifting of a portion of said tag out of its plane, so as to form an aperture in said tag of a shape substantially complementary to the outer peripheral shape of the projecting spout of a pot into which said bag is placed for preparing said beverage, said aperture permitting said tag to be slipped over the end of and to be attached to said spout, so as to prevent said tag and said string from sliding into the pot, and a portion of the edge of said tag at said aperture then engaging at least with the lower side of said spout and adapted to serve as said drop catcher taking up drops of liquid running down from the pouring end of said spout.

U.S. Pat. No. 3,539,355

Inventor: Sam Kasakoff

Issued: Nov. 10, 1970

A coffee bag assembly comprising:
(a) a normally open and expansible bag formed of liquid-permeable filter material, said bag having a capacity, when expanded, to contain a substantial volume of water,
(b) a charge of ground coffee contained in said open bag, whereby liquid coffee is brewed by filling the open bag in the expanded state with boiling water,
(c) an envelope enclosing said charged open bag and provided with a removable seal, and
(d) means coupled to said open bag sequentially to cause closure thereof and to effect contraction of the closed bag constituted by a strap which encircles the bag and is secured thereto, one half of the strap having a broad band with a longitudinal slot therein, the other half having a narrow band which extends through said slot such that when the ends of the halves are pulled in opposite directions the bag is compressed whereby the water is subjected to pressure to express the resultant coffee brew through the filter.

U.S. Pat. No. 4,680,185

Inventor: Barbara D. Illk

Issued: Jul. 14, 1987

An infusion package, such as a tea bag, having porous side panels and an open mouth through which material may be inserted. Edges of the package at the mouth are foldable over each other to close the mouth. A string on the folded over portions is extended through an aperture remote from the mouth and serves to inhibit unfolding.

U.K. Patent Number GB2167380

Inventor: Hugh Patrick Christie

Issued: May 29, 1986

An infusion package comprises a cover having two leaves and a tea bag stapled to one leaf only below the fold line. In use the tea bag is suspended in the cup with the leaf outside the cup to be supported by a wedging action in cantilever fashion with the leaf folded upwardly and backwardly to fully expose the top of the cup for the pouring in of the water.

WIPO Patent Number WO91/13580

Inventor: Shomarla PTY Limited

Issued: Sep. 19, 1991

The invention provides an improved infusion bag, for containing tea, coffee or the like. The bag incorporates means for compression, such as a string which is attached to the bag, for example at its base by knot. The bag of the invention may be single chambered or double chambered, inter alia. The invention also provides a method of manufacturing the bag.

While these infusion bags may be suitable for the purposes for which they were designed, they would not be as suitable for the purposes of the present invention, as hereinafter described.

SUMMARY OF THE PRESENT INVENTION

The present invention discloses an infusion bag having means for selectively inserting any desired dry beverage material. The disposable infusion bag has spaced apart reinforced elements fixedly attached to the bag material with a string passing through the elements in predetermined positions whereby pressure applied to the distal ends of the string causes the top corners to fold forward engaging the bag whereupon the remaining triangular center element folds over covering the previously folded corners preventing any of the inserted material from escaping. The bag may be reusable by unfolding the bag, discarding the used contents, replacing with fresh material and refolding the bag.

A primary object of the present invention is to provide an infusion bag for submersing dry beverage material in a liquid.

Another object of the present invention is to provide an infusion bag that can be sealed once the material has been added therein.

Yet another object of the present invention is to provide an infusion bag having reinforced elements to keep the bag sealed after submersion in a liquid.

Still yet another object of the present invention is to provide an infusion bag having a plurality of spaced apart segmented reinforced elements forming an integral part of said infusion bag.

Another object of the present invention is to provide an infusion bag wherein said segmented elements are fixedly attached to the infusion bag whereby the infusion bag material forms living hinges between said segmented elements.

Yet another object of the present invention is to provide an infusion bag having a string engaging the segmented reinforced elements whereby pressure placed upon the distal ends of the string causes the reinforced elements to fold in a predetermined pattern sealing the infusion bag closed.

Additional objects of the present invention will appear as the description proceeds.

The present invention overcomes the shortcomings of the prior art by providing an infusion bag having means for selectively inserting any desired dry beverage material. The disposable infusion bag has spaced apart reinforced elements fixedly attached to the bag material with a string passing through said elements in predetermined positions whereby pressure applied to the distal ends of said string causes the top corners to fold forward engaging the bag whereupon the remaining triangular center element folds over covering the previously folded corners preventing any of the inserted material from escaping.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
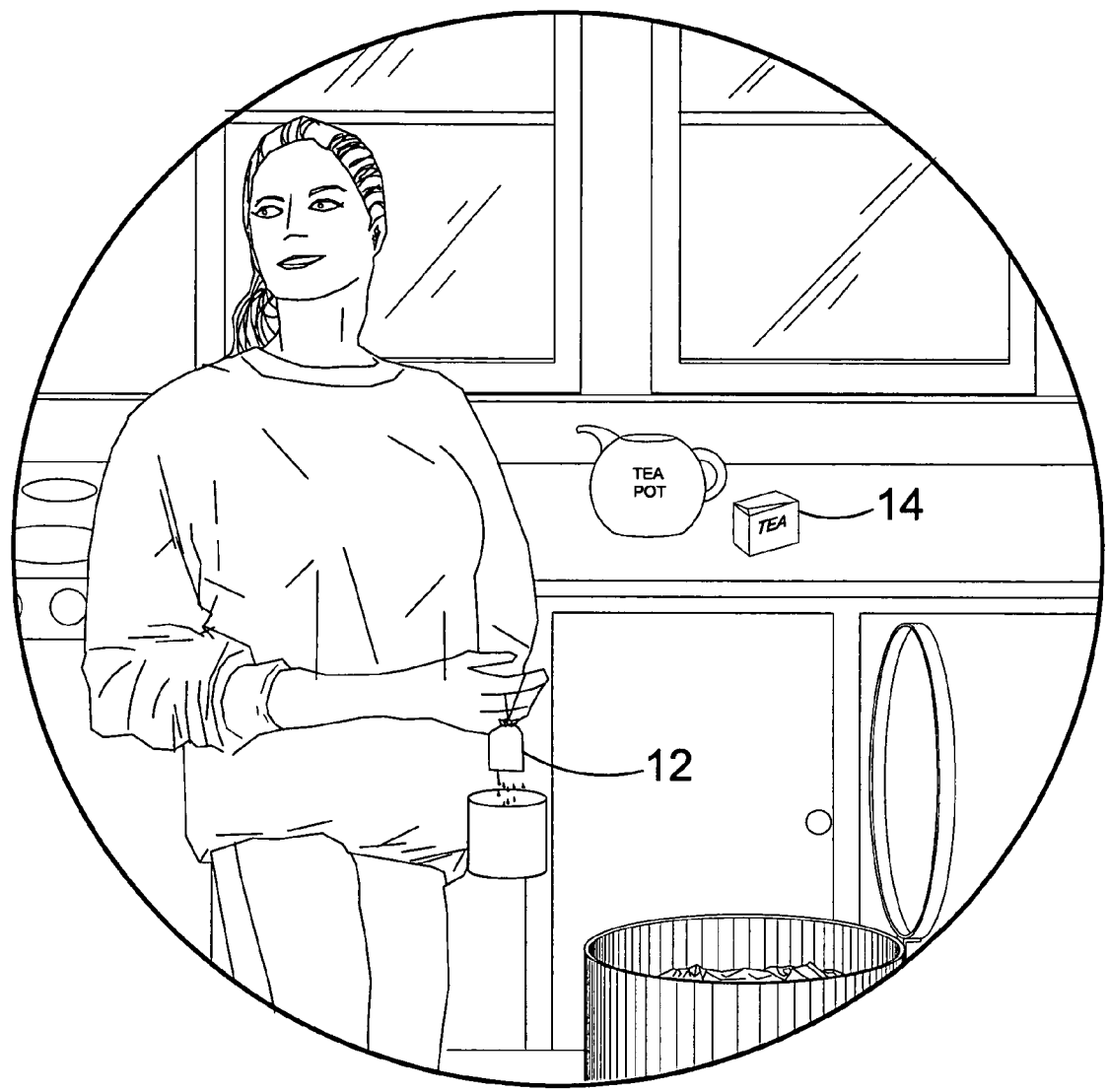
FIG. 1 is an illustrative view of prior art.

With regard to reference numerals used, the following numbering is used throughout the drawings.
10 present invention
12 prior art
14 tea
16 loose tea
18 bag
20 reinforced element
22 string
24 loop
26 fold
28 arrow
30 top corner
32 middle portion
34 opening
36 first fold line
38 second fold line
40 center
42 loop

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of a prior art infusion bag 12. There are existing infusion bags 12 known in the art, which are comprised of soft, porous and fibrous filter sheet material that remains coherent while in hot liquid. These tea bags 12 are prone to spillage of tea 14, coffee or other dry beverage material contents from the top of the bag and are inconvenient and difficult to transport. The tie-down reinforced infusion bag of the present invention over comes the short comings of prior art by providing a user fillable infusion bag for use with loose tea, coffee or any dry beverage material and having a plurality of reinforced elements for securely closing the bag.

Figure 2:
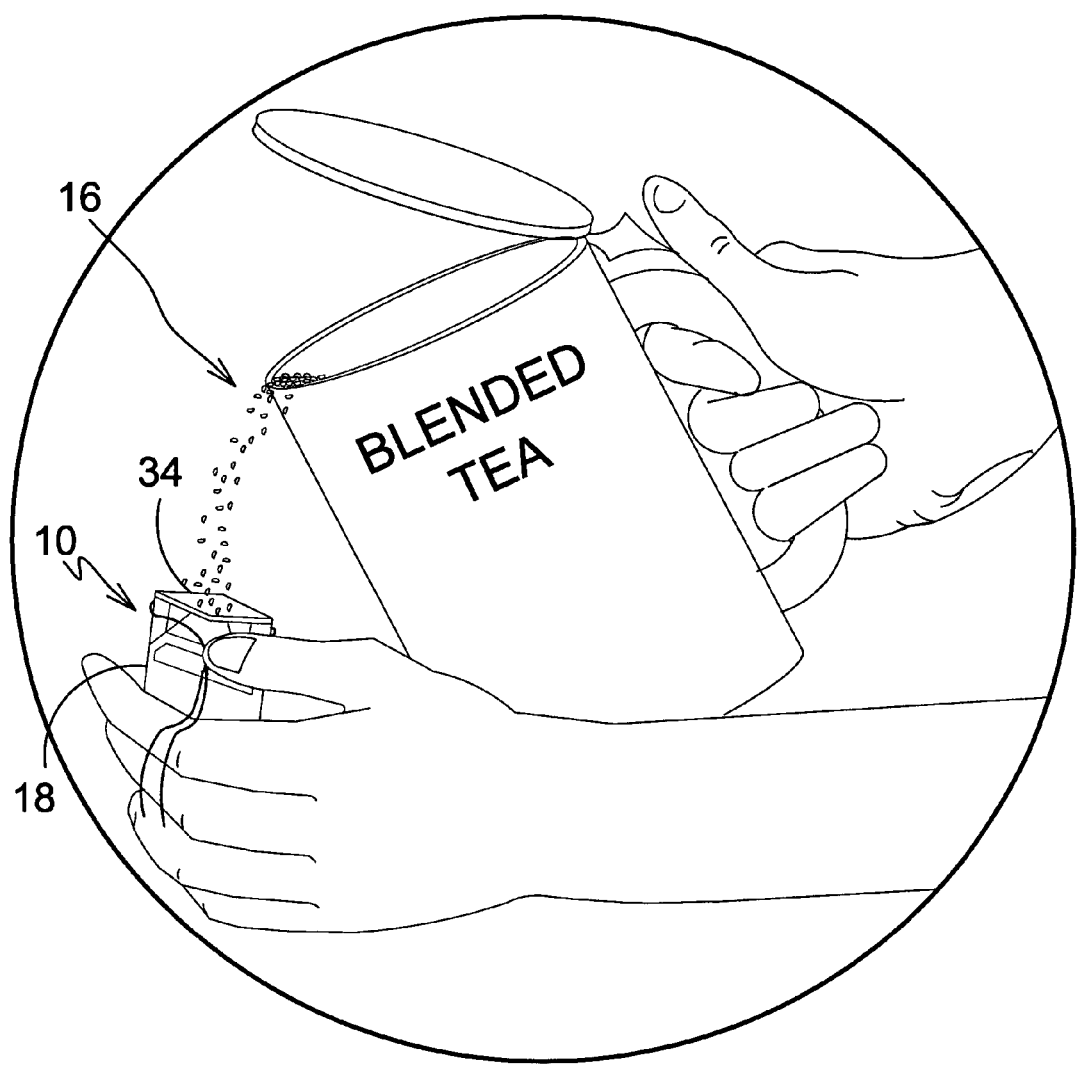
FIG. 2 is an illustrative view of the present invention in use.

Turning to FIG. 2, shown therein is an illustrative view of the present invention 10 in use. Shown is the tie-down reinforced infusion bag of the present invention 10 providing a user fillable infusion bag 18 for use with loose tea 16, coffee or any dry beverage material and having a plurality of reinforced elements for securely closing the bag. An advantage of this device 10 is the user may choose which brand or blend of tea 16, coffee or any dry beverage material they would like to use and insert it through the bag opening or mouth 34. Although designed for one-time use it may be possible to re-use the infusion bag 18.

Figure 3:
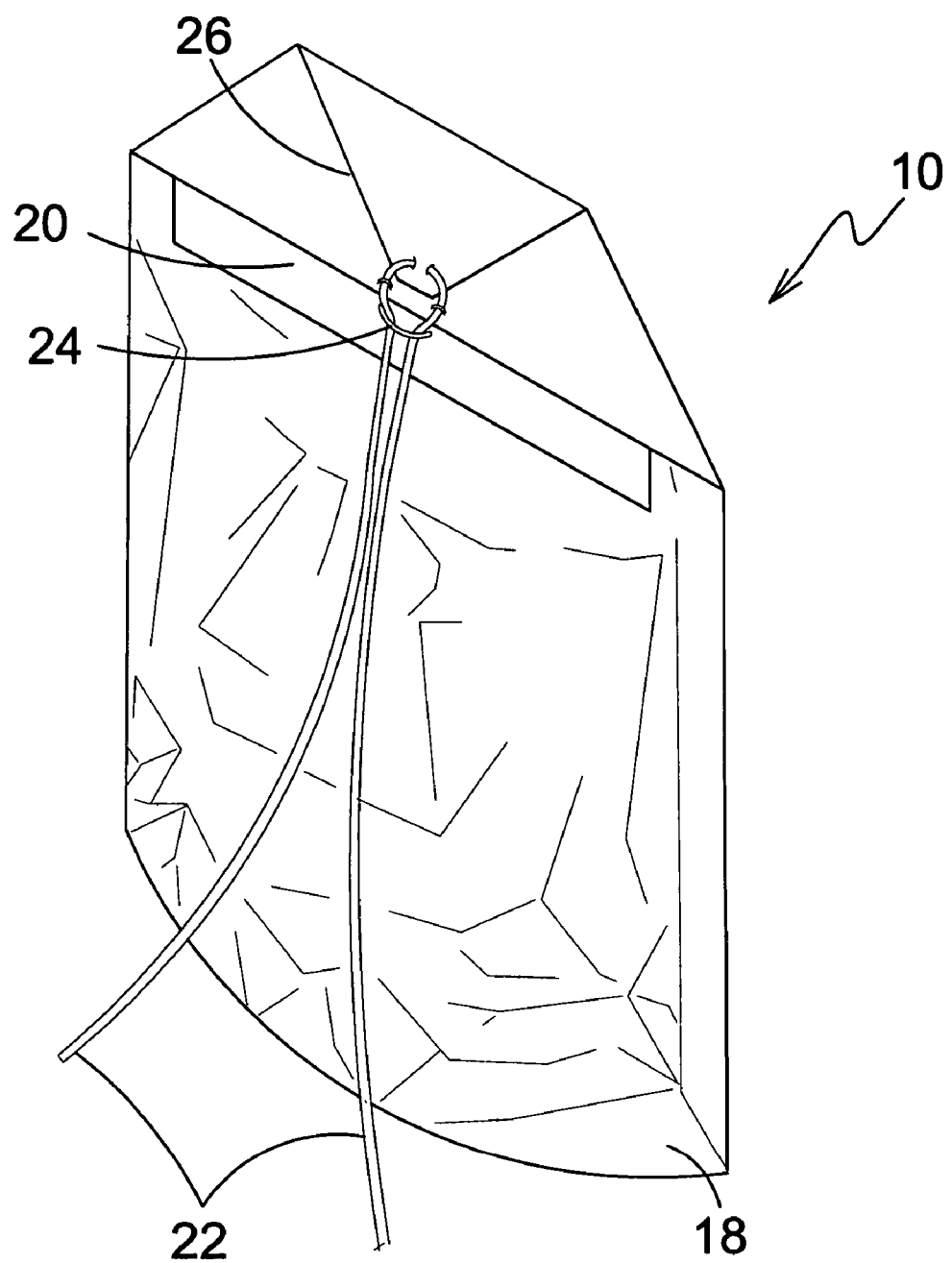
FIG. 3 is a perspective view of the present invention.

Turning to FIG. 3, shown therein is a perspective view of the present invention 10. Shown is a perspective view of the tie-down reinforced infusion bag 18 of the present invention 10 providing a user fillable infusion bag for use with loose tea, coffee or any dry beverage material and having a plurality of reinforced elements 20 for securely closing the bag. An advantage of this device is the user may choose which brand or blend of tea, coffee or any dry beverage material they would like to use. Since the infusion bags 18 securely close, they are convenient and easy to transport. Also shown are string 22, loop 24 and fold 26.

Figure 4:
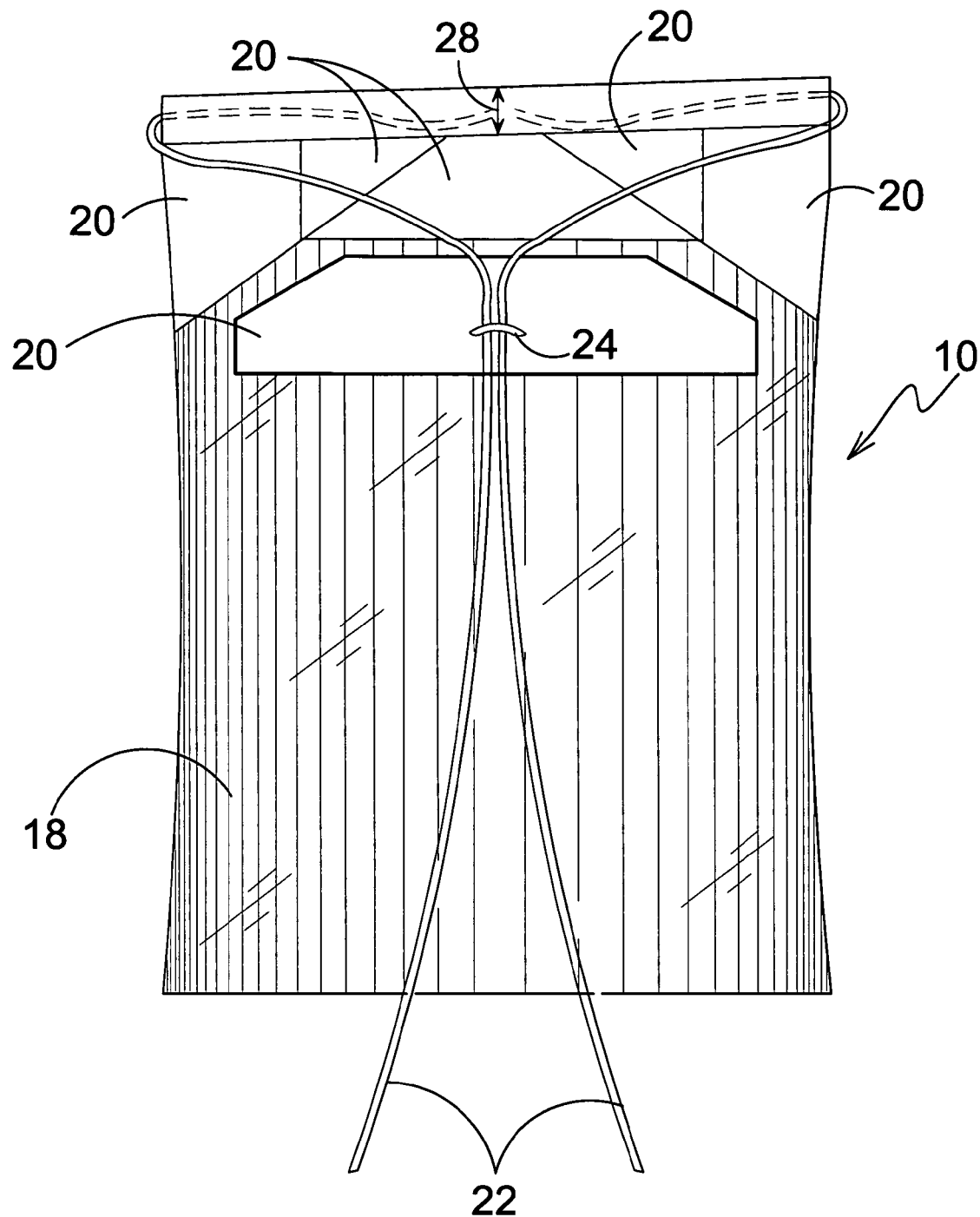
FIG. 4 is a front view of the present invention.

Turning to FIG. 4, shown therein is a front view of the present invention 10. The infusion bag 18 of the present invention 10 has sides that are of slightly different heights as shown by arrow 28 enabling the consumer to easily open the bag to put in their tea, coffee or any dry beverage material. The front of the infusion bag 18 is reinforced at 20 where string 22 passes through a loop 24 disposed thereon. The string 22 can be passed either through the bag 18 at that point or through a loop 24. The top of the front side of the bag 18 is reinforced in five sections at 20 and are sewn, pressed on or reinforced by other means.

Figure 5:
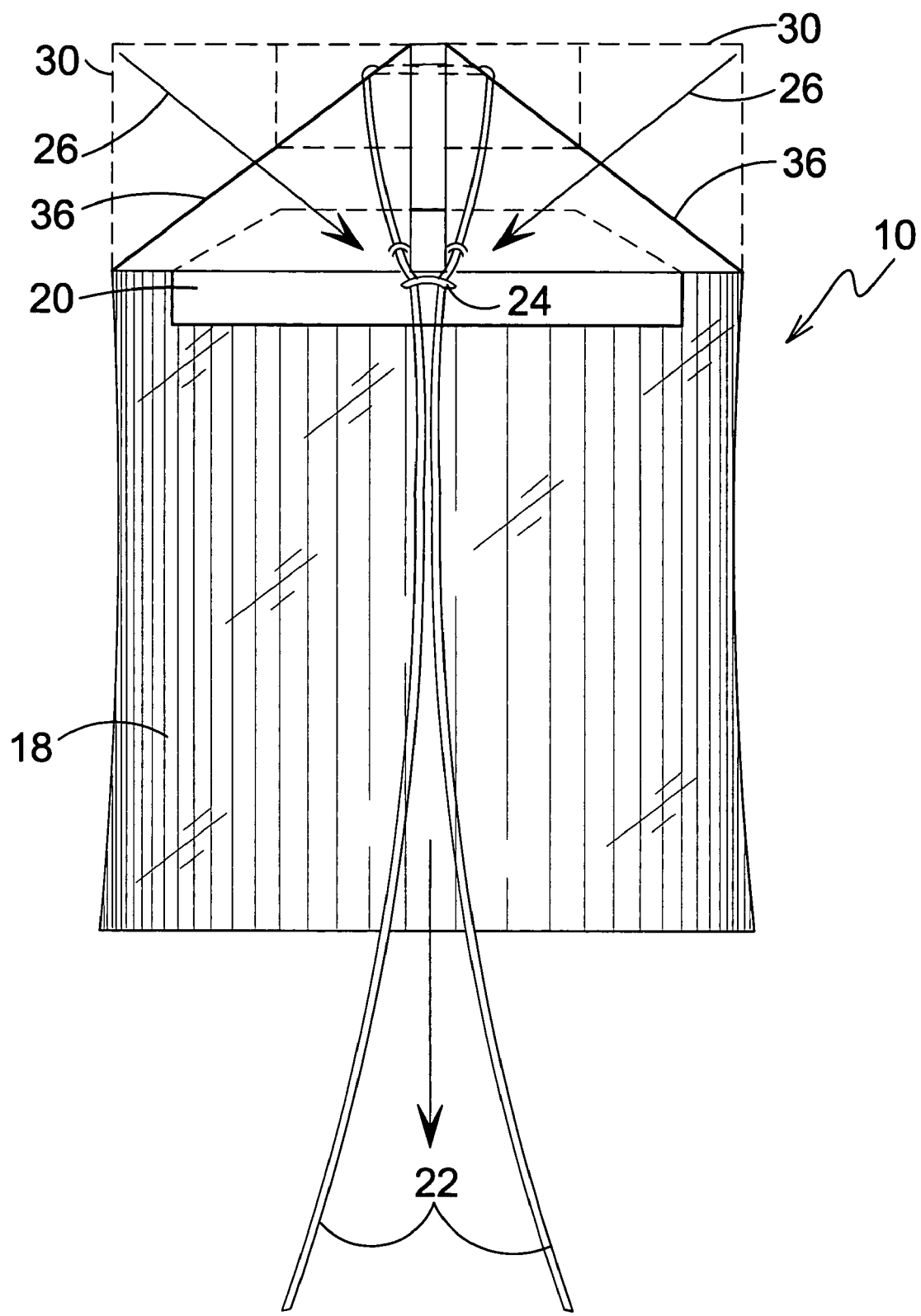
FIG. 5 is a front view of the first fold of the present invention.

Turning to FIG. 5, shown therein is a front view of the first fold 26 of the present invention 10. The infusion bag 18 of the present invention 10 has a plurality of reinforced members 20 whereby once the desired dry beverage material has been placed therein, the bag is closed by pulling on the distal ends of the strings 22 which causes the top corners 30 to fold forward along a first fold line 36 engaging the bag. Continued pressure on the strings 22 completely closes the infusion bag 18.

Figure 6:
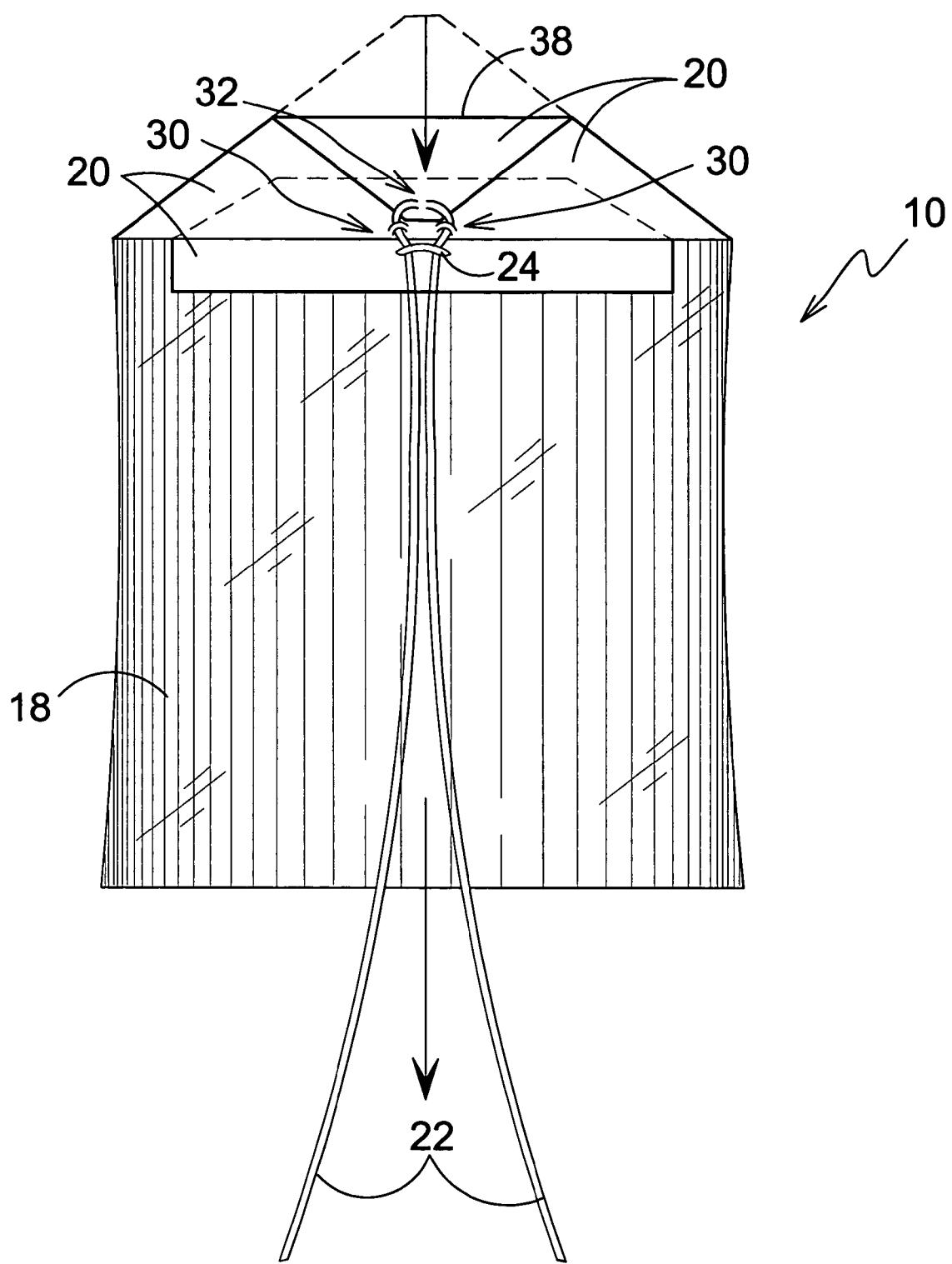
FIG. 6 is a front view of the present invention in the closed position.

Turning to FIG. 6, shown therein is a front view of the present invention 10 in the closed position. As previously illustrated, pulling on the distal ends of the strings 22 causes the top corners 30 to fold forward engaging the bag 18. Continued pressure on the strings 22 causes the middle portion 32 to fold over at a second fold line 38 sealing the bag 18 in the closed position. The string 22 will cinch the flaps 30 in the closed position thereby preventing release of any of the dry beverage material even when completely submerged in water. Also shown are bag 18, reinforcements 20 and loop 24.

Figure 7:
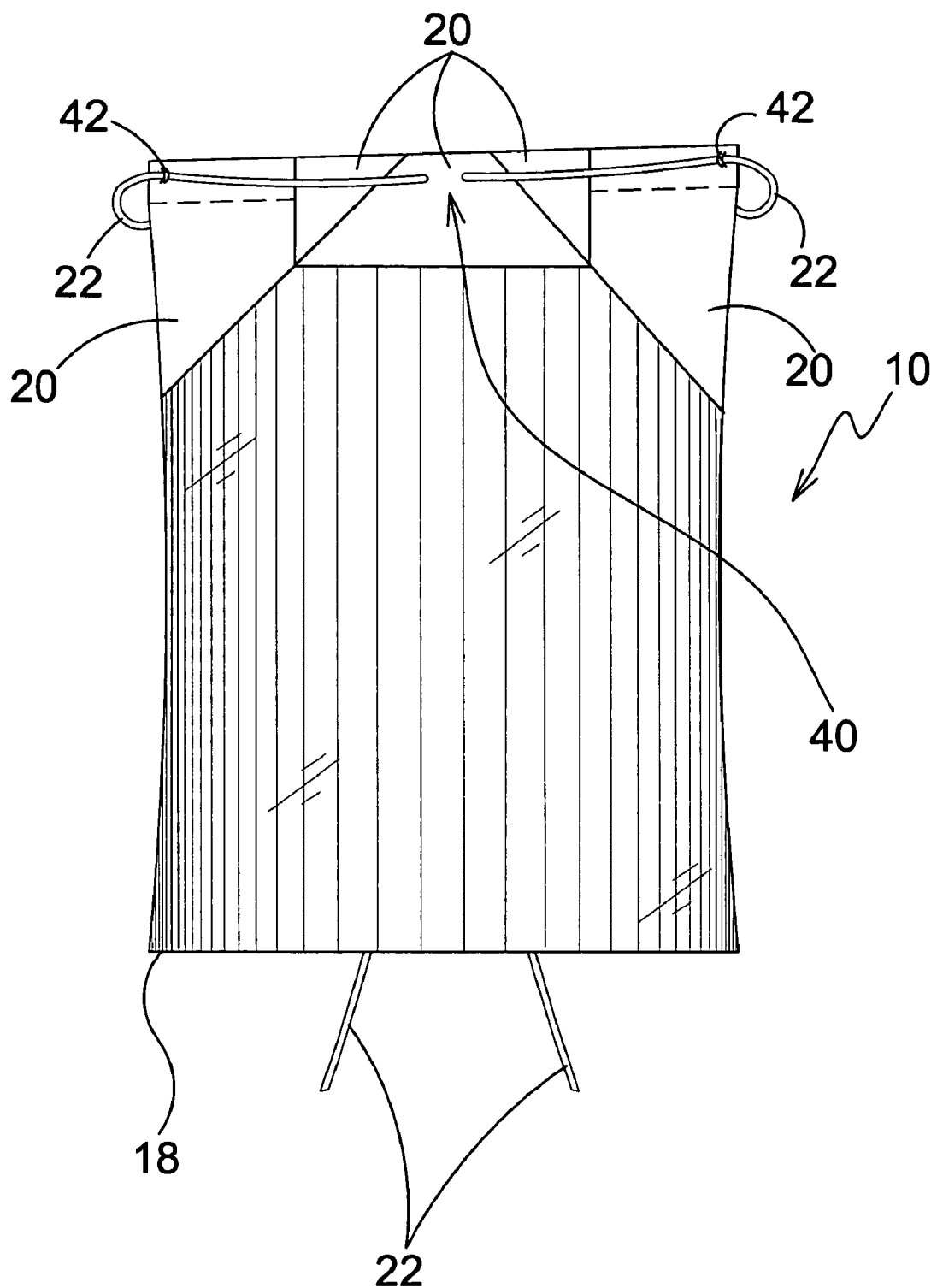
FIG. 7 is a rear view of the present invention.

Turning to FIG. 7, shown therein is a rear view of the present invention 10. The crucial part of the infusion bag of the present invention 10 is that the back of the infusion bag has five reinforced sections 20 at the top of the bag 18 which are sewn, pressed on or reinforced by other means, enabling the top of the bag to fold down easily when the strings 22 are pulled. The string 22 passes through the center 40 of the top back of the bag 18, then passes through loops 42 at the top left and right corners of the back of the bag. The string 22 can be passed either through the bag 18 at those points or through loops.

Figure 8:
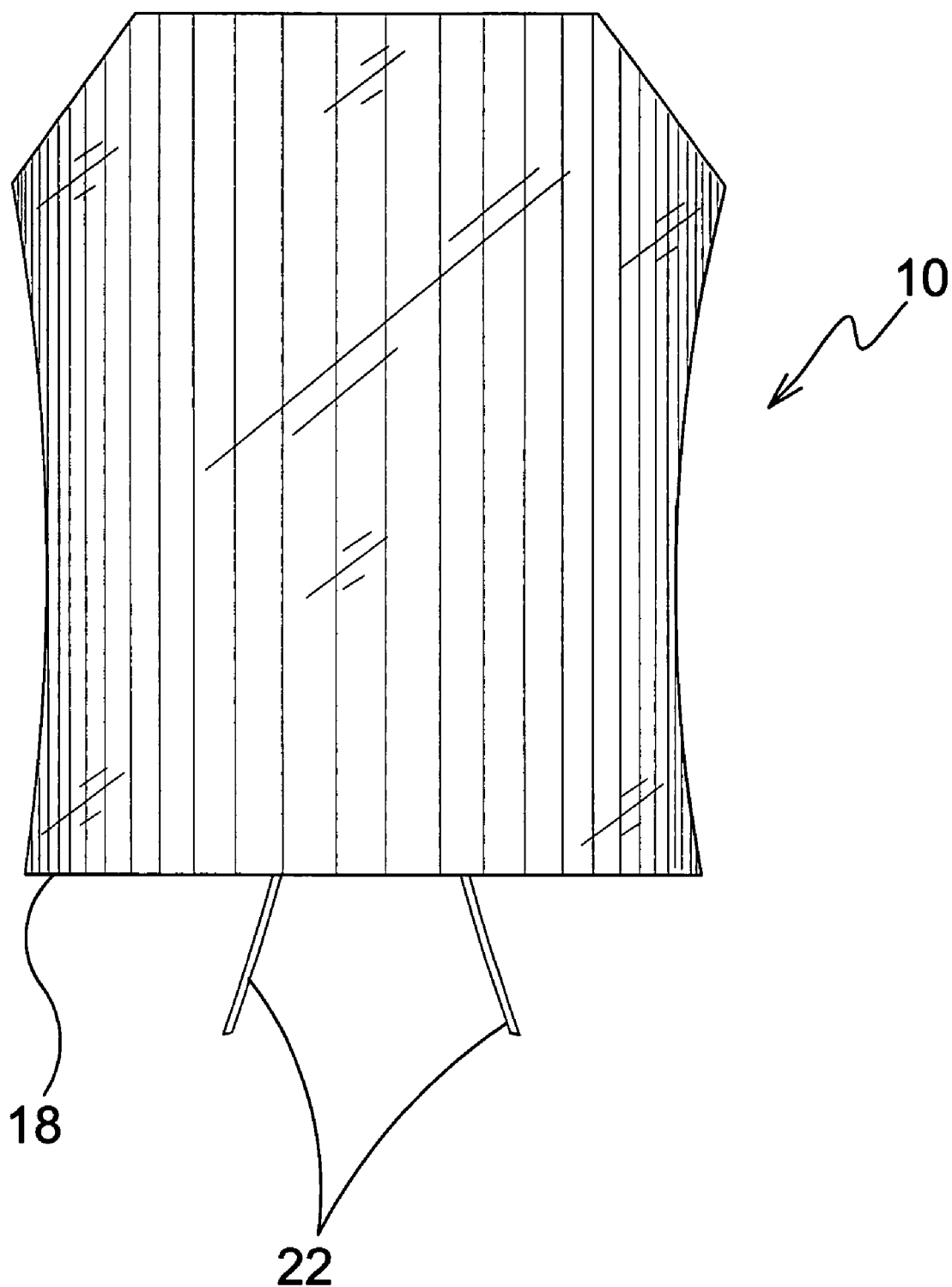
FIG. 8 is a rear view of the present invention in the closed position.

Turning to FIG. 8, shown therein is a rear view of the present invention 10 in the closed position. The crucial part of the infusion bag 18 of the present invention 18 is that the back of the infusion bag has five reinforced sections at the top of the bag, which are sewn, pressed on or reinforced by other means, enabling the top of the bag to fold down easily when the strings 22 are pulled. The string 22 passes through the center of the top back of the bag 18, then passes through loops at the top left and right corners of the back of the bag. The string 22 can be passed either through the bag at those points or through loops.

What is claimed to be new and desired to be protected by Letters Patent is set forth in the appended claims.

I claim:

1. An infusion bag for manually filling and closing the bag, comprising:

an infusion bag defined by front and rear opposing surfaces, top and bottom opposing ends, and first and second opposing side edges joining the front and rear surfaces wherein said top end is open forming a mouth through which material can be placed in the bag, wherein said bag is substantially rectangular having top corners and a top edge at the top end, and a pair of adjacent apertures located in said rear opposing surface adjacent the top edge thereof, midway between said side edges;

first and second loops, said first and second loops being disposed respectively, on the respective top corners of said rear surface of said bag, and a third loop being disposed on said front surface of said bag midway between said first and second opposing side edges, and a string having first and second ends, wherein a single strand of said string passes continuously through said first loop, both apertures, and said second loop on the rear surface of said bag and then portions of the single strand loop around each opposing side edge onto the front surface of the bag and coming together down through the third loop in a double strand and ending below the third loop in two free ends; each of said apertures and said loops being present in association with a reinforcing element;

said apertures and loops being positioned in said bag, and said string being movable through said apertures and said loops such that when said free ends of said string are pulled downwardly, a first pair of diagonal fold lines in said front and rear opposing surfaces defined by said reinforcement elements permit the top corners of said bag to fold down, and a third fold line parallel to a top edge of said bag and defined by said reinforcing elements permit a second fold of said bag when said string is pulled further, causing said first and second loops to be pulled adjacent said third loop, resulting in cinching of the folded top corners and completely closing the mouth of the bag.

2. The infusion bag of claim 1, wherein said reinforced sections are sewn onto said bag.

3. The infusion bag of claim 1, wherein said reinforced sections are pressed onto said bag.

* * * * *